UNITED STATES PATENT OFFICE.

CHARLES W. DOUGHTY, OF AUGUSTA, GEORGIA.

FIREPROOFING COMPOUND.

SPECIFICATION forming part of Letters Patent No. 402,235, dated April 30, 1889.

Application filed July 25, 1888. Serial No. 280,990. (No specimens.)

*To all whom it may concern:*

Be it known that I, CHARLES W. DOUGHTY, a citizen of the United States of America, residing at Augusta, in the county of Richmond and State of Georgia, have invented certain new and useful Improvements in Fireproofing Compounds, of which the following is a specification.

The object of my invention is to produce a fireproofing compound to be applied mainly to cotton-bales, and is designed to greatly reduce the fire risk on said bales by preventing the "runover flame" or "flash of flame" that causes fire to spread rapidly from row to row, tier to tier, or car-load to car-load, or from one end of a ship's hold to the other, and by preventing the communication of flame, and also the destruction of the bagging, reducing all the risks to a minimum. I accomplish these objects by means of a fireproofing and antiseptic compound applied to the bales or bagging thereof, and consisting of materials in the proportions hereinafter stated.

The ingredients are: linseed-oil, one gallon, or about eight pounds; copperas, thirty pounds, dissolved in sixteen gallons of water, and added to the linseed-oil; and to this is added about one hundred and thirty-six pounds of dried and finely-ground kaolin, or a sufficient quantity to make the mixture of the consistency of paint. This compound is applied to the bales of cotton with a paint-brush or whitewash-brush in a well-known manner, either after the bales are packed and ready for shipment, or it may be applied to the bagging before packing, and the uncovered parts of the bale then coated over, as may be most convenient.

The copperas serves as a protection of the fiber of the cotton and of the bagging against decay, so that the latter may be used over and over again to cover cotton-bales, while the other substances cause the lint to adhere in a flattened position upon the bagging, and is well coated and covered over with the fire-proof copperas and kaolin.

I am aware that asbestus and pulverized fire-clay have been used with a very small proportion of copperas as a fire-proof compound; but I am not aware that all the ingredients of my composition in the proportions stated have been used together.

Having now fully described my invention, I claim—

The herein-described composition of matter for protecting cotton-bales against flash of flame and deterioration, consisting of linseed-oil, copperas, water, and kaolin, in substantially the proportions specified.

In testimony whereof I affix my signature in presence of two witnesses.

CHARLES W. DOUGHTY.

Witnesses:
WM. D. A. WALKER,
G. T. SIBLEY.